March 17, 1942.                F. C. KELLEY                2,276,847
                             METHOD OF BRAZING
                           Filed Sept. 28, 1939
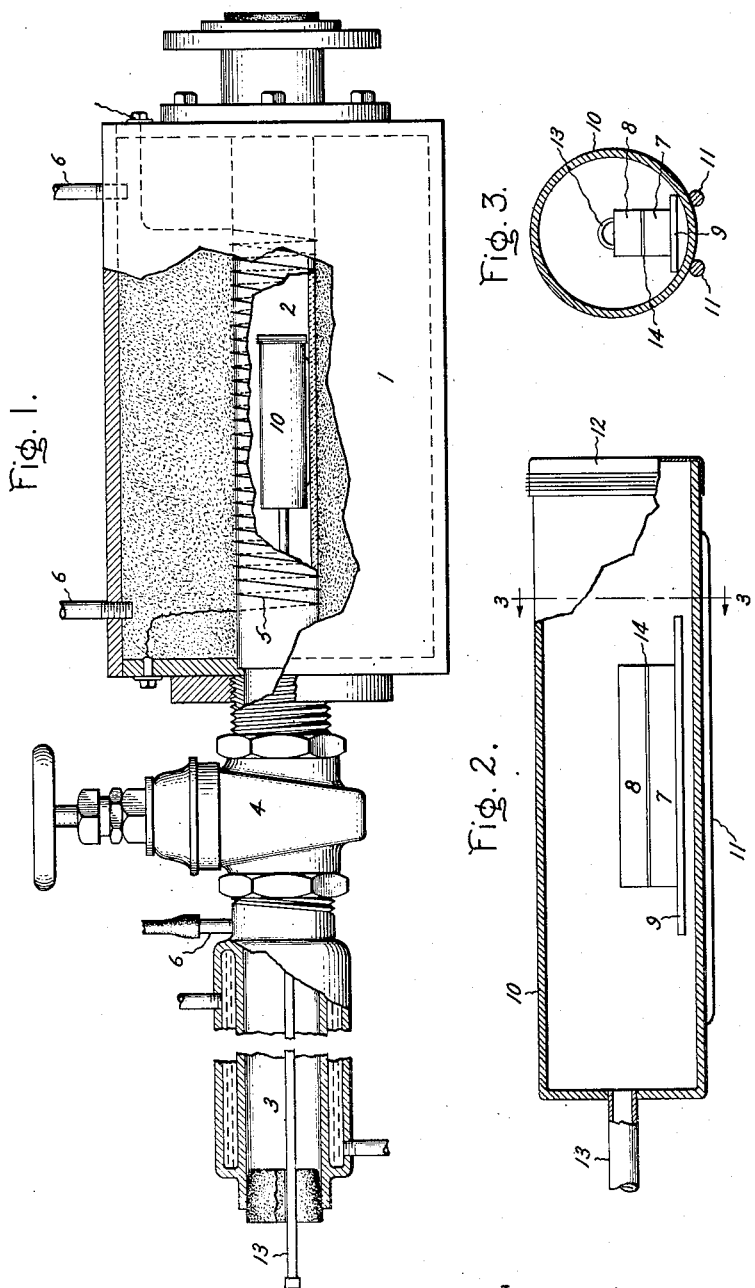
Inventor:
Floyd C. Kelley,
by Harry E. Dunham
His Attorney.

Patented Mar. 17, 1942

2,276,847

UNITED STATES PATENT OFFICE 2,276,847

METHOD OF BRAZING

Floyd C. Kelley, Schenectady, N. Y., assignor to General Electric Company, a corporation of New York Application September 28, 1939, Serial No. 296,941

6 Claims. (Cl. 113—112)

The present invention relates to a method of brazing and more particularly to a method for brazing chrome steel. Prior to the present invention it has been possible to braze chrome steels by employing a flux and carrying out the brazing operation in a hydrogen atmosphere. However, the brazed joints produced by the prior process have been lacking in strength and entirely unsatisfactory. The weakness in such brazed joints has been due to the flux trapped in the joint, gas pockets caused by decomposition of the flux, and the presence of small quantities of oxygen and water vapor in the furnace atmosphere.

It is one of the objects of my invention to provide a method of brazing in which the brazed junction has an unusually high strength. It is a further object of my invention to provide an efficient and satisfactory method for securely brazing chrome steel.

The novel features which are characteristic of my invention are set forth with particularity in the appended claims. My invention however will best be understood from reference to the following specification when considered in connection with the accompanying drawing in which Fig. 1 is an elevational view partly broken away of an apparatus whereby my invention may be carried into effect; Fig. 2 is a longitudinal sectional view partly in elevation and on an enlarged scale of the metal receptacle in which the brazing operation is carried out, while Fig. 3 is a cross section on the line 3—3 of Fig. 2.

Referring more particularly to the drawing, I have indicated at 1 an ordinary hydrogen furnace. The furnace comprises a heating section 2 and a water cooled section 3, the two sections being separated by means of a gate valve 4. Heat is supplied to the furnace by means of a coil 5 connected to a suitable source of electric power. Line hydrogen or other suitable reducing atmosphere is supplied to the furnace through inlets 6. The structures 7, 8 to be brazed are positioned on a rack or boat 9 in a cylindrical metal container or receptacle 10. Receptacle 10 is spaced from the bottom of the heating chamber by a pair of parallel runners 11 and is provided at one end with a very thin removable metal closure member 12 which is wired to the receptacle 10 and provided with a pin hole about 35 to 40 mils in diameter extending therethrough. This opening permits the escape of gas from receptacle 10 and prevents the rapidly expanding gas from blowing off the closure member 12 when the container is introduced into the heated section of the furnace. The opposite end of container 10 is provided with a relatively long tube 13 through which highly purified hydrogen gas is supplied to the container.

The hydrogen gas supplied to container 10 is purified to such an extent that it will reduce $Cr_2O_3$. Furthermore, all water vapor is removed so completely from the hydrogen that when it is passed through liquid air no ice will form. To produce hydrogen of this high degree of purity the gas is first passed through a tube filled with copper wire or shavings heated to a temperature of about 600° C. The hydrogen is then passed over $P_2O_5$ in a second tube. These successive operations of passing the hydrogen through the heated copper and over $P_2O_5$ are repeated three times using additional tubes containing respectively copper and $P_2O_5$. The pure hydrogen emerging from the last tube containing $P_2O_5$ will not contain a trace of oxygen or water vapor. However, if it is desired to employ additional precautions the hydrogen may be bubbled through liquid air.

In carrying out the brazing operation the juxtaposed faces of the structures 7 and 8 to be brazed are provided with very smooth flat surfaces and preferably placed one on top of the other on the rack 9 with a very thin intermediate sheet of brazing metal 14 about 0.002 inch thick. No flux is employed. The container 10 is pushed into the furnace heating chamber 2 from the cold end of the furnace and the furnace brought up to a temperature of about 1200° C. The brazing period will vary depending on the composition of the structures to be brazed and their size. When the brazing operation is completed the brazed structure is drawn into the cooling chamber of the furnace which, with chrome steel structures, gives the effect of a quench. If the furnace has a temperature of 1200° C. prior to the insertion of the container 10 therein the container should be placed first in the cold chamber 3 of the furnace, hydrogen supplied to the container, and the latter washed out thoroughly with the pure hydrogen. The gate 4 of the furnace should then be opened and the charge pushed into the heated zone.

The sheet 14 of brazing metal employed may be any well known brazing metal such as copper or a copper-cobalt alloy containing about 3% cobalt etc. However, to obtain the greatest tensile strength in the brazed joint I prefer to employ a copper-nickel-iron brazing alloy containing about 85% copper, 10% nickel and 5% iron, particularly if the structures to be brazed are chrome steel. When the latter brazing alloy is employed in brazing chrome steel structures containing for example about 12% chromium, I have obtained brazed joints which have a tensile strength greater than 125,000 lbs. per square inch and even greater than 139,000 lbs. per square inch. Such strength in a brazed joint is very unusual and far beyond the tensile strength heretofore obtainable in any brazed joint. The strength of the brazed junction may be compared with the tensile strength of chrome steel which, after the brazing operation, is about 200,000 lbs. per square inch. If the brazed chrome steel structure is drawn at a temperature of about 650° C. in a suitable atmosphere, for example air or a reducing atmosphere, it will be found that the chrome steel and the brazed joint each have a tensile strength of about 115,000 lbs. per square inch.

The junction between the brazed structures is very thin, the average width being about 0.0008 inch. A microscopic examination of the junction between the brazed structures shows some diffusion of the brazing alloy into the steel the greatest penetration being along the grain boundaries with a very thin layer of brazing metal between the diffused layers on either side. When the brazed structure is pulled apart the break will occur at the boundary between the steel solid solution and the brazing alloy.

Although I have obtained the highest tensile strength in brazed chrome steel structures containing about 12% chromium unusually high strength brazed joints may be obtained with any other steels by the use of my improved process. In the case of straight carbon steel however, it will be found desirable to remove some of the surface carbon by prefiring the steel for example in line hydrogen so that the copper or other brazing metal may wet the steel more easily.

The tensile strength of the brazed joint obtained by my process will of course depend to a great extent upon the physical properties of the steel employed. I have obtained the greatest strength in brazed chrome steel containing about 12% chromium where the brazing alloy consisted of copper, nickel and iron, as indicated above. However, improved tensile strengths may be obtained with other steels, for example 0.4C steel; 1% C steel and 3½% nickel steel. The increase in strength in this series is greatest in the 3½% nickel steel and least in the 0.4C steel.

I claim:

1. The method of brazing two metal structures which comprises positioning a thin sheet of brazing metal between the structures to be brazed, inserting the assembled structures into a substantially closed metal container, positioning said container in a furnace supplied with a reducing gas and heated to a brazing temperature, supplying hydrogen gas free from water vapor to said container and at a pressure sufficient to provide a continuous flow of hydrogen through said container.

2. The method for brazing a pair of metal structures which comprises positioning a thin sheet of brazing metal consisting of about 5% iron, 10% nickel and 85% copper between the two structures to be brazed, inserting the assembled structures into a substantially closed metal container, positioning said container in a furnace supplied with reducing gas and heated at a temperature of about 1200° C., said structures in said container being enveloped in an atmosphere of hydrogen free from water vapor.

3. A method of brazing which comprises positioning the structures to be brazed with an interposed sheet of brazing metal in a substantially closed metal tube provided with a pipe adapted to be connected to a source of pure hydrogen, positioning said tube in a furnace supplied with a reducing gas and heated at a brazing temperature and supplying to said tube purified hydrogen gas at a pressure sufficient to provide a continuous flow of purified hydrogen through said tube, said purified gas being capable of reducing $Cr_2O_3$.

4. A process for thermally joining two chrome steel structures which comprises placing said structures in juxtaposition with a thin layer of brazing metal between said structures, inserting the assembled structures into a substantially closed metal container provided with a pipe adapted to be connected to a source of pure hydrogen, positioning said container in a furnace supplied with a reducing gas and heated to a brazing temperature, and supplying to said container hydrogen gas at a pressure sufficient to provide a continuous flow of hydrogen through said container, the hydrogen supplied to said container being capable of reducing $Cr_2O_3$.

5. A process for thermally joining two chrome steel structures which comprises placing said structures in juxtaposition with a layer of brazing metal about 0.002 inch thick between said structures, inserting the assembled structures into a substantially closed metal container, positioning said container in a furnace supplied with a reducing gas and heated to a brazing temperature, and supplying to said container hydrogen gas at a pressure sufficient to provide a continuous flow of hydrogen through said container, the hydrogen supplied to said container being capable of reducing $Cr_2O_3$.

6. A process for thermally joining two chrome steel structures which comprises placing said structures in juxtaposition with a sheet of brazing metal about 0.002 inch thick and consisting of about 5% iron, about 10% nickel and about 85% copper between the structures to be brazed, inserting the assembled structures into a substantially closed metal container, positioning said container in a furnace supplied with reducing gas and heated to a brazing temperature, and supplying to said container hydrogen gas at a pressure sufficient to provide a continuous flow of hydrogen through said container, the hydrogen supplied to said container being capable of reducing $Cr_2O_3$.

FLOYD C. KELLEY.